(12) United States Patent
De Anna et al.

(10) Patent No.: US 9,030,117 B2
(45) Date of Patent: May 12, 2015

(54) METHOD FOR FEEDING LIGHT SOURCES AND RELATED DEVICE

(75) Inventors: Paolo De Anna, Vallà di Riese Pio X (IT); Ilan D'Incà, Feltre (IT)

(73) Assignee: Osram GmbH, Munich (DE)

( * ) Notice: Subject to any disclaimer, the term of this patent is extended or adjusted under 35 U.S.C. 154(b) by 367 days.

(21) Appl. No.: 13/548,257

(22) Filed: Jul. 13, 2012

(65) Prior Publication Data

US 2013/0015777 A1 Jan. 17, 2013

(30) Foreign Application Priority Data

Jul. 15, 2011 (IT) .............................. TO2011A0637

(51) Int. Cl.

| | |
|---|---|
| *H05B 37/00* | (2006.01) |
| *H05B 39/00* | (2006.01) |
| *H05B 41/14* | (2006.01) |
| *H05B 41/16* | (2006.01) |
| *H05B 41/24* | (2006.01) |
| *H05B 37/02* | (2006.01) |
| *H05B 33/08* | (2006.01) |
| *H05B 41/28* | (2006.01) |
| *H05B 41/285* | (2006.01) |
| *H05B 41/292* | (2006.01) |
| *H05B 41/298* | (2006.01) |
| *H02M 3/335* | (2006.01) |

(52) U.S. Cl.
CPC ............ *H05B 37/02* (2013.01); *H05B 33/0815* (2013.01); *H05B 33/0884* (2013.01); *H05B 41/28* (2013.01); *H05B 41/2853* (2013.01); *H05B 41/2923* (2013.01); *H05B 41/2983* (2013.01); *H02M 3/335* (2013.01)

(58) Field of Classification Search
None
See application file for complete search history.

(56) References Cited

U.S. PATENT DOCUMENTS

| | | | |
|---|---|---|---|
| 6,967,585 B2 | 11/2005 | Lomax, Jr. et al. | |
| 7,804,259 B2 * | 9/2010 | Ootsuka et al. | ................ 315/307 |
| 8,098,022 B2 | 1/2012 | Krummel | |
| 8,169,149 B2 | 5/2012 | Klier | |
| 8,212,493 B2 * | 7/2012 | Melanson et al. | ............. 315/247 |
| 2009/0322238 A1 | 12/2009 | Ziegler | |
| 2010/0194287 A1 | 8/2010 | Vivero-Flores et al. | |

FOREIGN PATENT DOCUMENTS

| | | |
|---|---|---|
| CN | 101938219 A | 1/2011 |
| CN | 201726182 U | 1/2011 |

(Continued)

OTHER PUBLICATIONS

English abstract of CN 201726182 U of Jan. 26, 2011.

(Continued)

*Primary Examiner* — Douglas W Owens
*Assistant Examiner* — Dedei K Hammond

(57) ABSTRACT

In various embodiments, a method for powering light sources from a input power supply through a converter circuit is provided including a primary side and a secondary side separated by a galvanic barrier, wherein the primary side includes a power factor control block with an output capacitor. The method may include providing save circuitry on said secondary side for saving operational data of the converter upon failure of said input power supply; and powering said save circuitry during saving said operational data with energy derived from said output capacitor of said power factor control block.

15 Claims, 3 Drawing Sheets

(56) References Cited

FOREIGN PATENT DOCUMENTS

| | | |
|---|---|---|
| EP | 2325988 A1 | 5/2011 |
| EP | 2375873 A1 | 10/2011 |
| WO | 2008128575 A1 | 10/2008 |
| WO | 2008138391 A1 | 11/2008 |

OTHER PUBLICATIONS

English translation of the office action issued in the corresponding Chinese application No. 201210242003.7, dated Apr. 22, 2014.

* cited by examiner

METHOD FOR FEEDING LIGHT SOURCES AND RELATED DEVICE

CROSS-REFERENCE TO RELATED APPLICATION

This application claims priority to Italian Patent Application Serial No. TO2011A000637, which was filed Jul. 15, 2011, and is incorporated herein by reference in its entirety.

TECHNICAL FIELD

The present disclosure relates to techniques for feeding lighting sources such as, for example, light emitting diode (LED) lighting sources.

Various embodiments may refer to DC/DC switching converters of the isolated type.

BACKGROUND

FIG. 1 is a general exemplary block diagram showing an isolated DC/DC switching converter, which can be used for example for feeding a LED lighting source.

The main components of the exemplary diagram in FIG. 1 are the following:
- 1: mains supply,
- 2: Power Factor Correction (PFC) circuit,
- 3: output capacitor of PFC circuit,
- 4: power stage (primary side),
- 5: galvanic barrier (transformer),
- 6: power stage (secondary side),
- 7: light source (in itself not being part of the feeding device, but shown in dashed lines for completeness of illustration).

The diagram in FIG. 1, which is of course wholly exemplary, provides in addition further elements, such as:
- 8: control circuitry (primary side),
- 9: control circuitry (secondary side),
- 10: auxiliary power stage (primary side),
- 11: auxiliary power stage (secondary side),
- 13: control board (primary side),
- 14: control input,
- 15: control board (secondary side),
- 17: auxiliary supply towards power stage (primary side) 4,
- 18: supply of control circuit 8 (primary side),
- 19: control line from circuit 8 towards power stage (primary side) 4,
- 20: supply of control circuit 9 (secondary side),
- 21: auxiliary supply towards power stage (secondary side) 6,
- 22: control line from circuit 9 towards power stage (secondary side) 6,
- 25: auxiliary supply from stage 10 towards control board (primary side) 13,
- 26: auxiliary supply from stage 11 towards control board (secondary side) 15, and
- 27: connection between control board (secondary side) 15 and power stage (secondary side) 6.

The general layout shown in FIG. 1 is known in itself, which makes it unnecessary to provide a more detailed description both of the structure and of the operation thereof.

In this respect it will be moreover appreciated that the exemplary embodiment in FIG. 1 includes various elements (e.g. the elements denoted by references 13, 14, 15, 25, 26, 27 or others) the presence whereof is wholly optional and/or which are adapted to be replaced, in part or completely, with equivalent elements.

For what of interest here, in FIG. 1 it is possible to identify two main parts of the converter circuit, namely a primary side and a secondary side mutually separated by a galvanic barrier 5, being embodied for example by a transformer and being adapted to ensure safety for a user in case of an accidental contact with the load (light source 7).

In some embodiments, the control circuit can include, on primary side 8 and/or on secondary side 9, "smart" logical circuits, adapted to control the behaviour of the converter circuit as a function of prescribed operational parameters.

In some embodiments, this may involve having to "save" data related to the device operation, by storing them in a non volatile memory if a failure of the input power supply 1 takes place (for example in the case of a major or minor voltage drop or of a complete interruption).

The diagram in FIG. 1 shows the possibility of providing a control board (essentially elements 13 and 15) adapted to interact with the supply unit and, for simplicity of illustration (but by no way as a compulsory condition), the circuitry performing such a saving function can be considered as being included in, or anyway dependent from board 15.

FIG. 2 (wherein parts, elements and components identical or equivalent to those described with reference to FIG. 1 are denoted by the same reference numbers as in that Figure) shows the possibility of providing, on the secondary side, an energy storage element 12, the function whereof is to supply the save circuitry during saving the data which must be stored.

The energy storage element 12 can be supplied by a charging circuit 23, which derives from secondary side 6 of the power stage the energy which must be stored in the energy storage element 12. In various embodiments, element 12 can be a capacitor, which stores the energy that can be used as a power supply when a failure from the power supply 1 from the mains takes place, i.e. when the input power supply from the mains is no longer available or sufficient to ensure the regular operation of the converter device.

In various embodiments, in the storage element 12 a sufficient amount of energy can be stored as to support the operation of the save circuitry (for example located in board 15) for the whole time interval needed to save the parameters, in presence of a failure of primary input power supply 1. This time interval depends in turn on the amount of data to be saved, also considering the power absorbed by the circuit during such operations.

The energy that can be stored in a capacitor can be expressed as $\frac{1}{2} \cdot CV^2$ (wherein C is the capacity and V is the charge voltage). In order to keep the output voltage at a suitable low value for a time interval sufficient to save the data, a rather high capacity C is required, which involves the use of a capacitor with large size and high cost.

For example, if a control system according to the DALI standard (Digital Addressable Lighting Interface) is used, in case of a drop of the input voltage approximately fifty parameters are stored for each channel, i.e. for each independently controlled LED string. The time interval needed for the data save operation can be 200 ms for each channel, so that on the whole, in the presence of N independently controlled LED strings, storage element 12 must be able to store a sufficient amount of energy to support the operation of the data save circuitry for a time interval of approximately N×200 ms.

In various embodiments, stage 2 (see FIG. 1), which is used for the power factor control (PFC) of input current and to stabilize the output voltage, can be implemented with a boost converter having a supply voltage higher than the maximum peak value of the rated input voltage. For example, in the case of a 200 V alternated input, the PFC stage output can be 400 V DC, applied across capacitor 3.

When the input power supply fails, the voltage on capacitor 3 starts dropping and the energy stored in the capacitor itself is absorbed by the main power stage 4, 6 (and therefore by load 7) and by auxiliary power stage 10, 11.

For this very reason, in various embodiments the need can be felt of providing energy storage element 12, adapted to supply the circuit for the remaining time needed to complete the save operations. Such an energy storage element can be arranged proximate to the smart circuit to be fed.

Generally speaking, the generation of auxiliary voltages within a feeding device in the lighting sector is a topic which has been extensively dealt with, also in patent literature. In this respect it is possible to refer, for example, to document WO-A-2008/128575, to document WO-A-2008/138391 and to European Patent Application EP 11159153.3.

SUMMARY

From the foregoing description the need arises of providing further improved solutions, for example concerning the possibility of reducing the capacity value (and therefore the size and cost) of the capacitor acting as an auxiliary energy storage on the secondary side of the converter, up to the very option to omit such a storage capacitor.

Various aspects of this disclosure meet such a need.

According to various aspects of this disclosure, such an object is achieved thanks to a method having the features specifically set forth in the claims that follow. Various aspects of this disclosure also concern a related device.

The claims are an integral part of the technical teaching of the invention provided herein.

Various embodiments are based on the acknowledgement that it is possible to reduce the size of the energy storage capacitor arranged on the secondary side (and in some cases to omit it altogether) by deriving, in case of an input supply failure, feeding energy from the output capacitor of the power factor correction (PFC) stage.

Various embodiments therefore provide savings in terms of space and cost.

In various embodiments, for example if the auxiliary power stage is implemented as a flyback converter, the capacity value (and therefore the size and cost) of the output capacitor can be reduced to a value sufficient to stabilize the output voltage with an acceptable ripple, without having to take into account the needs of energy storage in order to face the input power supply failure.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
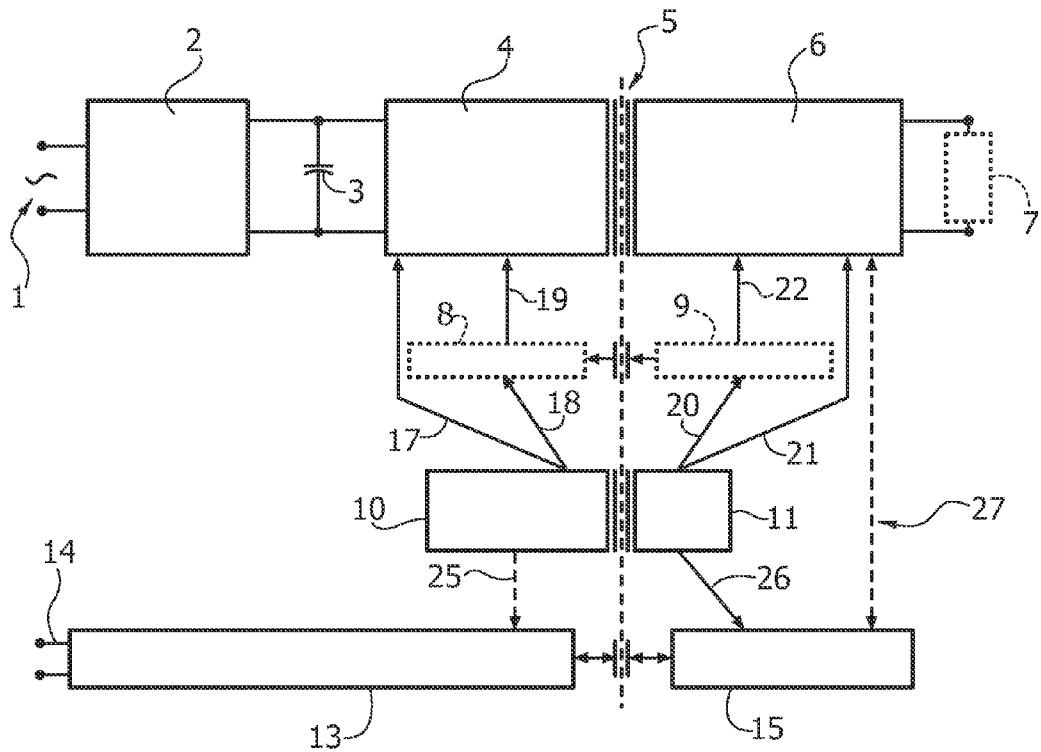
FIGS. 1 and 2 have already been described in the foregoing.

In various embodiments, the detailed description in the following may refer to a converter circuit as generally depicted in FIG. 1.

Various presently considered embodiments may therefore refer to specific implementations of a circuit corresponding to the general arrangement of FIG. 1.

Figure 2:
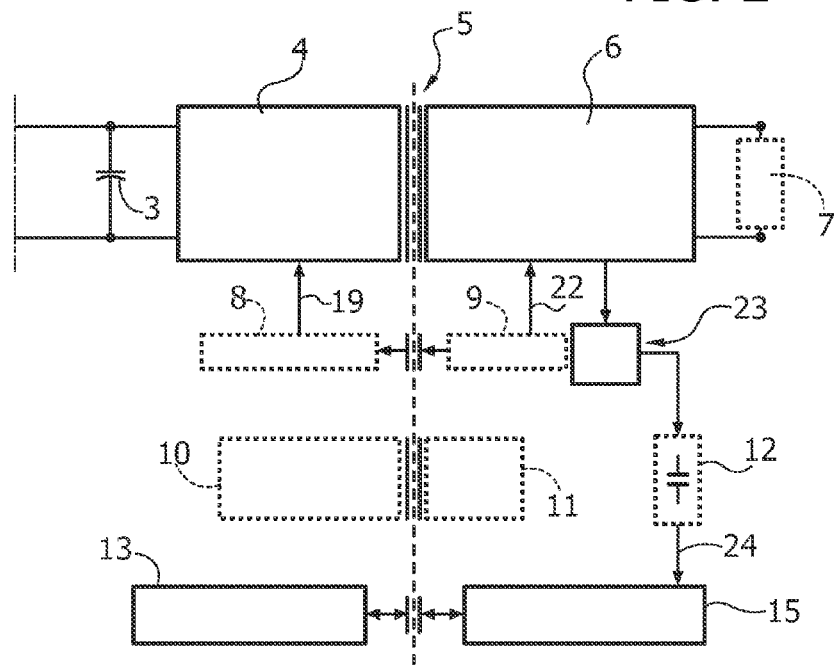

To avoid unnecessarily overburdening the present detailed description, parts, elements or components which have been previously described with reference to FIG. 1 and FIG. 2 will be denoted in the following by the same references, avoiding a repetition of the related detailed description.

Figure 3:
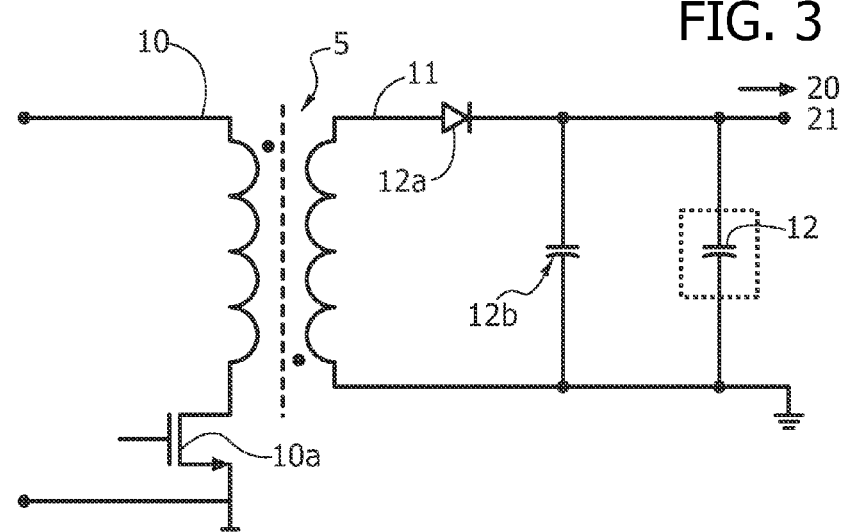
FIG. 3 is a circuit diagram of an embodiment.

FIG. 3 shows a first observation by the inventors, i.e. that in various embodiments storage capacitor 12 can be supplied via auxiliary power stage 10, 11.

To achieve this, referring to the embodiment of FIG. 3, it is possible to use a flyback converter including, according to the typical structure of a flyback converter, a diode 12a and an output capacitor 12b, connected to the secondary winding 11 of the auxiliary supply stage, whose primary winding 10 is subjected to the action of an electronic switch such as, for example, a MOSFET 10a.

As for the energy storage, as an alternative to or in conjunction with an additional capacitor 12, an output capacitor 12b of the converter can be used having a capacity value higher than the rated capacity required for the converter operation. For this reason, in the diagram of FIG. 3 (and in the diagram of FIG. 6 which will be explained in the following), capacitor 12 (the "additional" capacitor to the flyback arrangement) is shown in dashed lines.

Figure 4:
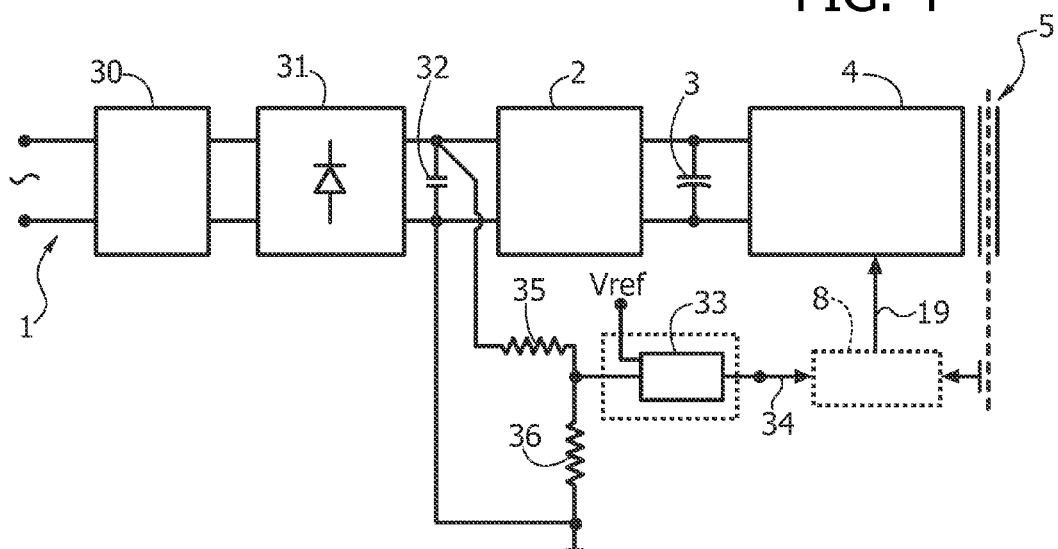
FIG. 4 is a block diagram of an embodiment.

Various embodiments, as schematically shown in FIG. 4, can make use of the possibility for the DC/DC converters, as shown in FIG. 1, to include filtering and stabilizing components, arranged upstream of form factor correction stage 2, including for example a filtering block 30, a bridge or half-bridge rectifier 31 and a capacitor 32 with a low value.

By detecting the voltage across capacitor 32 it is therefore possible to spot the possible failure of input power supply 1.

The diagram in FIG. 4 refers as an example to the possible provision of a comparator circuit 33, adapted to compare a reference voltage value Vref to a voltage corresponding to the voltage across capacitor 32.

The latter voltage can for example be detected by resorting to a resistive voltage divider, detecting voltage across capacitor 32. The divider may include, for example, a first resistor 35 and a second resistor 36, the latter being interposed between an input of comparator circuit 33 and ground. In such exemplary embodiment, comparator circuit 33 compares the voltage across resistor 36 with the value of reference voltage Vref.

Figure 5:
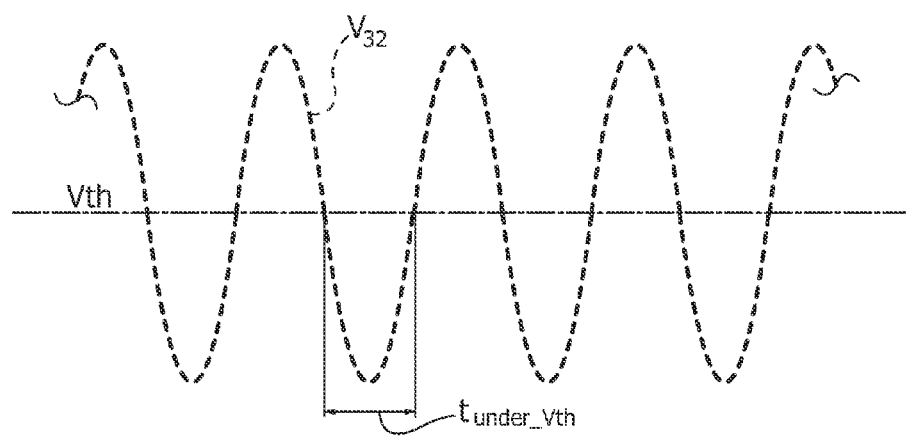
FIG. 5 shows the pattern of a wave form in an embodiment.

Whatever the specific embodiment used, the voltage across capacitor 32 can have an alternated pattern, as schematically shown by line $V_{32}$ in FIG. 5, with a value alternatively higher or lower than a reference voltage Vth, which depends, according to the specific embodiments, on reference voltage Vref.

In this embodiment, the output voltage from comparator 33, provided on a line denoted as 34 in FIG. 4, can therefore have a "high" value when the voltage across capacitor 32 is higher than threshold value Vth, and a "low" value when (in time intervals such as the interval denoted by $t_{under\_Vth}$) voltage across capacitor 32 is below threshold value Vth.

The duration of the intervals wherein signal 34 is at a "low" level can be transferred, as a read parameter, to control circuit 8, so that this circuit can identify the supply voltage drop when the duration of such intervals reaches a determined limit value, so as to start the save operations of operational parameters, generating the data save request.

In various embodiments, it is then possible to implement measures that can interrupt the energy absorption from capacitor 3, for example:
  deactivate power stage 4 (and stage 6 supplied thereby), and/or
  "disconnect" load 7, i.e. act on stage 6 so as to interrupt its connection to load 7.

Either measure, or both of them, can be implemented for example through lines 19 and 22, and/or line 27 (FIG. 1) which connects control board 15 (secondary side) and power stage 6 (secondary side).

As will be seen in the following, in various embodiments capacitor 3 can be used to feed supply energy to the data save circuitry, during the data saving itself.

In various embodiments, it may therefore be convenient to save the energy stored on capacitor 3, preventing this energy from being dispersed onto power stage 4, 6 and or onto load 7.

If load 7 is disconnected (and therefore the connection thereof to power stage 4, 6 is interrupted), it is possible to feed the save circuitry (assumed to be arranged within board 15) with the energy stored on capacitor 3, via power stage 4, 6 which in this case is not supplying load 7. The power stage can now absorb energy from capacitor 3 and transfer it towards the save circuitry; this solution can therefore be implemented also in the absence of auxiliary power stage 10, 11.

The energy transfer from capacitor 3 towards save circuitry (however it may be accomplished) may take place either through capacitor 12 (i.e. substantially according to an arrangement as in FIG. 2, possibly omitting charge circuit 23), or directly (in which case capacitor 12 can be omitted).

Figure 6:
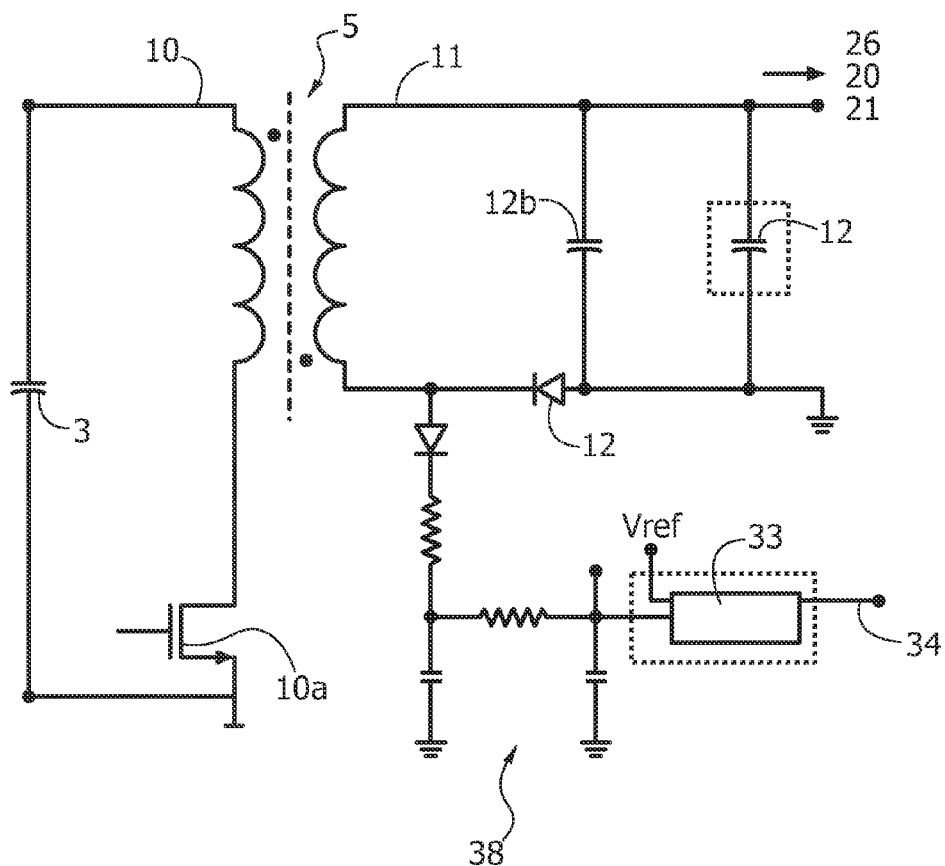
FIG. 6 is a block diagram of an embodiment.

The diagram in FIG. 6 highlights the fact that, in various embodiments, the drop of primary input voltage 1 can be detected by detecting the voltage drop across capacitor 3, arranged at the output of stage 2, instead of on capacitor 32 (possibly) provided at the input of stage 2 itself.

The diagram in FIG. 6 shows moreover the fact that, in various embodiments, the drop of primary input voltage 1 can be detected on the secondary side of the converter, for example at secondary supply circuit 28 (which is here assumed to be the same as in the exemplary embodiment of FIG. 3, i.e. a flyback converter). The arrangement of the detecting circuit may correspond on the whole to what has been shown in document U.S. Pat. No. 6,967,585, which makes it unnecessary to provide a more detailed description herein.

Figure 7:
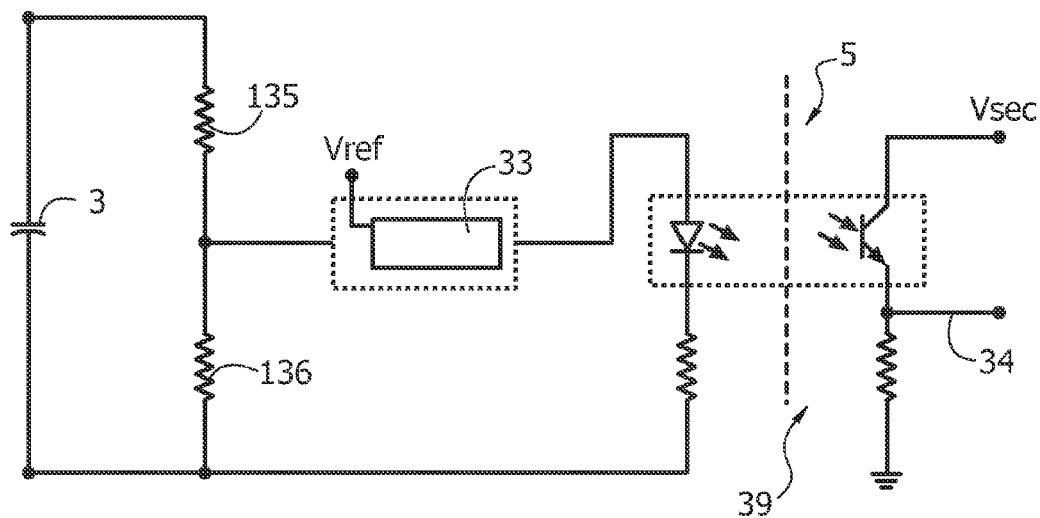
FIG. 7 is a block diagram of an embodiment.

A detecting function of the supply failure according to a solution which is similar to what shown in FIG. 6 (i.e., by detecting the voltage across capacitor 3 at the output of power factor correction stage 2) can moreover be implemented according to the solution exemplified in FIG. 7, i.e. on the primary side of the converter, wherein the comparator circuit 33 is supplied, in addition to reference voltage Vref, with the voltage at the middle point of a resistive divider 135, 136 connected across capacitor 3.

In this case, the output signal from capacitor 33 is applied onto line 34, adapted to transfer it towards control 8 (i.e. towards the secondary side of the converter) via an optocoupler 39, that embodies a corresponding part of galvanic barrier 5 in order to transfer the alarm signal (a alarm about the failure of input supply 1) to the secondary side of the converter.

In various embodiments, the output voltage of the detecting circuit can be approximately proportional to the input voltage (in practice it is possible to refer to the voltage across capacitor 3) so that, if this voltage is sent to a comparator circuit such as circuit 33, the failure of input power supply 1 can be detected also on the secondary side, starting the data save function by using the energy stored in capacitor 3.

Whatever the specific embodiment used to detect the failure of mains supply 1, when such an event is detected the corresponding alarm signal on line 34 causes the save circuitry of the control circuit (for example on the secondary side denoted by 15) to start saving the parameters by using, as a supply, the energy stored in capacitor 3.

In conventional solutions, such as the one shown in FIG. 1, in order to save the operational data as soon as a supply voltage drop is detected, only the energy stored in capacitor 12 is used. To such a purpose, it is therefore detected that the supply voltage is no longer present, and a data save request is generated towards the secondary side, which keeps on being fed thanks to the energy stored in capacitor 12, while the energy stored in capacitor 3 is used to feed the load. In solutions such as shown in FIG. 1, capacitor 3 is therefore present because it is useful for the PFC block and, when supply voltage 1 drops, the capacitor discharges rather rapidly, because the energy stored therein is absorbed by load 7 via power circuit 4, 6.

The solutions according to the embodiments, on the contrary, make use of capacitor 3 during the data save process, performed in case of failure of supply voltage 1, in order to preserve the supply of the save circuitry (e.g. board 15), so that capacitor 12 can be implemented with reduced size and capacity, or even omitted completely (in any case obtaining savings in terms of space and cost).

In various embodiments it is therefore possible to operate by detecting a supply voltage drop and by generating a data save request.

This can be accomplished, for example, with the circuits of FIG. 4, FIG. 6 or FIG. 7, each by itself or in mutual combination: for example, in various embodiments it is possible to use a detector acting on capacitor 32 (see FIG. 4) and also a detector acting on capacitor 3 (see for instance FIG. 6), this being a combination which allows for a longer time to save data.

In various embodiments, the same circuits can be used both to detect the failure of the supply voltage and to generate a request of data saving.

For example, in various embodiments, it is possible to use only the circuit of FIG. 7, while at the same time switching off main supply stage 4, 6 and requesting a data saving to the secondary side as soon as a signal transition is generated which indicates the alarm situation due to the input supply failure.

It will be appreciated, moreover, that the circuit in FIG. 4 compares a voltage which is proportional to input voltage with a reference threshold Vref, while the circuits of FIG. 6 and FIG. 7 operate by comparing Vref with a voltage proportional to the voltage of capacitor 3, and not with the input voltage, although in any case they are mutually connected values.

Moreover, the circuits in FIG. 4, FIG. 6 and FIG. 7 include a comparator with a different function.

The circuit in FIG. 4 generates a signal: the time is measured during which this signal is high vs low, while in the circuits of FIG. 6 and FIG. 7 a transition from high to low or vice versa is sufficient to trigger the alarm signal.

In the circuit of FIG. 4 the operating principle involves therefore measuring the time during which the signal is below a predetermined reference threshold (see diagram in FIG. 5), in order to determine the occurrence of a voltage drop.

The circuits in FIG. 6 and in FIG. 7 operate by measuring indirectly (FIG. 6) or directly (FIG. 7) the voltage of capacitor 3, in order to generate the data save request because the power supply has failed.

Moreover, the circuit in FIG. 4 can operate on the primary side of the converter, both for detecting and for acting to switch off primary side 4 of power stage 4, 6.

The circuit in FIG. 6 is on the secondary side (on the right of galvanic bather 5 in the Figures) and therefore performs an indirect measure of the voltage across capacitor 3, operating in a similar way on the secondary side in order to output the alarm signal.

The circuit in FIG. 7 is on the primary side (on the left of galvanic barrier 5 in the Figures) and therefore performs a direct detection (measure) of the voltage across capacitor 3, but operates on the secondary side (via opto-coupler 39) in order to output the alarm signal.

The circuit in FIG. 6 is arranged according to a flyback topology (elements 10, 10a, 11, 12, 12a, 12b) with a circuit that performs an indirect detection of voltage across capacitor 3 which comprises elements 38, 33, 34. The mains 38 supplies a voltage proportional to the voltage on the capacitor and, when such a voltage goes below a predetermined threshold (Vref), the comparator generates a alarm signal, i.e. a data save request. In this case, unlike the case in FIG. 4, times are not measured.

The circuit in FIG. 7 is based on the same operating principle which has been previously described referring to the circuit in FIG. 6; the difference is that, in the case of FIG. 7, the measure is applied directly across capacitor 3 by using resistors 135 and 136, through a comparison with a suitable predetermined threshold Vref and by transferring to the secondary side, by using opto-coupler 39, the alarm signal and the data save request.

Specific implementation details of the various embodiments of FIG. 4, FIG. 6 and FIG. 7 can be anyway freely transferred from one to another embodiment (for example the circuits which operate on capacitor 32 could act on capacitor 3, and the circuits which operate on capacitor 3 could act on capacitor 32).

Whatever the measures adopted to detect a failure of power input supply 1 and to generate the data save request, the save circuitry (which for simplicity is assumed to be arranged within board 15, but in various embodiments can also be implemented in different ways according to criteria known in themselves) is powered during data saving thanks to the energy stored in capacitor 3.

With such an aim, in order to transfer the energy stored on capacitor 3 towards the save circuitry (both in the presence of storage capacitor 12, whose size can be reduced, and in the absence of capacitor 12), it is possible to follow different methods.

For example, as exemplified in FIG. 6, in various embodiments it is possible to use auxiliary power stage 10, 11, so that the energy of capacitor 3 is transferred from primary side 10 to secondary side 11, and therefrom towards the save circuitry.

In this case, in various embodiments, it is possible to switch off (for example through lines 19 and 22) the main power stage, avoiding the unnecessary absorption thereby of useful energy stored in capacitor 3. At this point, in practice, only the auxiliary power stage 10 and 11 will absorb energy from capacitor 3, and it will be possible to use that energy to power the save circuitry of the operational data of the converter.

In various embodiments, this can virtually allow to dispense with storage capacitor 12, or at least to reduce its capacity value (and therefore its size and cost) to minimum values.

An auxiliary power stage with a flyback arrangement offers the possibility to use flyback capacitor 12b in order to perform, at least partly, the storage function of capacitor 12. However, the auxiliary power stage needs not be a flyback stage.

As has already been previously stated, in various embodiments, for example in the absence of auxiliary power stage 10, 11, the data save circuitry can be supplied with energy drawn from capacitor 3 through the main power stage 4, 6.

In this case, in various embodiments, it is possible to act on stage 6 (for example via line 27) in such a way as to disconnect load 7 (light source) from power stage 4, 6, so that stage 4, 6 transfers energy from capacitor 3 (only) towards save circuitry (e.g. 15) and not towards load 7, avoiding therefore a waste of the energy needed to save the data. In this case, actually, power stage 4, 6 is not feeding load 7, and can then transfer power from capacitor 3 to the save circuitry.

In various embodiments, the energy transfer from capacitor 3 towards the save circuitry can take place either via capacitor 12 or directly (in which case capacitor 12 may be omitted).

Various embodiments can therefore power the circuits for data saving by using the energy stored in output capacitor 3 of PFC stage denoted by 2.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for powering light sources from an input power supply through a converter circuit including a primary side and a secondary side separated by a galvanic barrier, wherein the primary side includes a power factor control block with an output capacitor, the method including: providing save circuitry on said secondary side for saving operational data of the converter upon failure of said input power supply; powering said save circuitry during saving said operational data with energy derived from said output capacitor of said power factor control block.

2. The method of claim 1, wherein said converter includes a power stage to power a light source, the method further comprising upon failure of said input power supply, powering said save circuitry with energy derived from said output capacitor of said power factor control block via an auxiliary power supply stage.

3. The method of claim 2, wherein said save circuitry is powered with energy derived from said output capacitor of said power factor control block via an auxiliary power supply stage by de-activating said power stage of the converter.

4. The method of claim 1, wherein said converter includes a power stage that powers a light source, the method further comprising, upon failure of said input power supply, disconnecting said light source from said power stage.

5. The method of claim 4, wherein said light source is disconnected from said power stage by powering said save circuitry with energy derived from said output capacitor of said power factor control block via said power stage.

6. A converter circuit to power light sources from an input power supply, the converter including a primary side and a secondary side separated by a galvanic bather, wherein: the primary side includes a power factor control block with an output capacitor; the secondary side includes save circuitry for saving operational data of the converter upon failure of said input power supply; connection elements are provided for powering said save circuitry during saving said operational data with energy derived from said output capacitor of said power factor control block.

7. The converter circuit of claim 6, further comprising: a power stage to power a light source and an auxiliary power supply stage, and wherein: said auxiliary power supply stage is configured for powering said save circuitry during saving said operational data with energy derived from said output capacitor of said power factor control block; and the converter circuit is configured for de-activating said power stage of the converter upon failure of said input power supply.

8. The converter circuit of claim 6, further comprising: a power stage to power a light source, and wherein the converter circuit is configured to disconnect said power stage of the converter from said light source upon failure of said input power supply, whereby said save circuitry is powered during saving said operational data with energy derived from said output capacitor of said power factor control block via said power stage.

9. The converter circuit of claim 6, further comprising: a detector to detect failure of said input power supply as a function of at least one voltage representative of the voltage of said input power supply out of: the voltage across said output capacitor of said power factor control block, and the voltage across a stabilizing capacitor arranged upstream of said power factor control block.

10. The converter circuit of claim 9, wherein said detector comprises a comparator to compare said at least one voltage representative of the voltage of said input power supply with a threshold and identify failure of said input power supply from a condition out of: the length of the intervals in which said at least one voltage representative of the voltage of said input power supply is below said threshold reaches a determined value, and said at least one voltage representative of the voltage of said input power supply exhibits a transition with respect to said threshold.

11. The converter circuit of claim 6, further comprising: a detector to detect said failure of said input power supply, wherein: said detector performs the detection action and emits a corresponding input power supply failure signal on one single side, primary or secondary, of the converter; or said detector performs the detection action on the primary side of the converter and emits a corresponding input power supply failure signal on the secondary side of the converter.

12. The converter circuit of claim 11, wherein said detector performs the detection action on the primary side of the converter and emits a corresponding input power supply failure signal on the secondary side of the converter via a galvanic barrier.

13. The converter circuit of claim 6, wherein said connecting elements power said save circuitry during saving said operational data with energy derived from said output capacitor of said power factor control block via a storage capacitor coupled to said save circuitry.

14. The converter circuit of claim 12, further comprising: a power stage to power a light source and an auxiliary power supply stage, and wherein: said auxiliary power supply stage is configured for powering said save circuitry during saving said operational data with energy derived from said output capacitor of said power factor control block; the converter circuit is configured for de-activating said power stage of the converter upon failure of said input power supply; wherein said auxiliary power supply stage is a stage with a respective output capacitor, wherein said respective output capacitor constitutes, at least in part, said storage capacitor.

15. The converter circuit of claim 14, wherein said auxiliary power supply stage is a stage of the flyback type.

* * * * *

UNITED STATES PATENT AND TRADEMARK OFFICE
CERTIFICATE OF CORRECTION

PATENT NO.       : 9,030,117 B2
APPLICATION NO.  : 13/548257
DATED            : May 12, 2015
INVENTOR(S)      : Paolo De Anna et al.

Page 1 of 1

It is certified that error appears in the above-identified patent and that said Letters Patent is hereby corrected as shown below:

In the Specification

Column 7, line 22: please delete "bather" between the words "galvanic" and "5" and write "barrier" in place thereof In the Claims Column 9, line 13, Claim 6: please delete "bather" between the words "galvanic" and "wherein" and write "barrier" in place thereof Signed and Sealed this
Twenty-ninth Day of September, 2015

Michelle K. Lee
*Director of the United States Patent and Trademark Office*